United States Patent [19]

Myers

[11] 4,230,827
[45] Oct. 28, 1980

[54] ETHYLENE OXIDE POLYMERS AS IMPACT MODIFIERS FOR PVC

[75] Inventor: Robert M. Myers, Philadelphia, Pa.

[73] Assignee: Rohm and Haas Company, Philadelphia, Pa.

[21] Appl. No.: 966,935

[22] Filed: Dec. 6, 1978

[51] Int. Cl.$^2$ .............................................. C08L 27/06
[52] U.S. Cl. .................................. 525/121; 528/418; 528/419; 528/103
[58] Field of Search ......................... 260/899; 525/121

[56] References Cited

U.S. PATENT DOCUMENTS

| | | | |
|---|---|---|---|
| 3,135,705 | 6/1964 | Vandenberg | 260/2 |
| 3,231,551 | 1/1966 | Herold et al. | 260/88.3 |
| 3,297,783 | 1/1967 | Bailey | 260/836 |
| 3,424,818 | 1/1969 | Hawley et al. | 260/836 |
| 3,453,347 | 7/1969 | Dreyfuss et al. | 260/897 |
| 3,541,065 | 11/1970 | Elmer et al. | 260/88.3 |

*Primary Examiner*—Carman J. Seccuro
*Attorney, Agent, or Firm*—Michael B. Fein

[57] ABSTRACT

Impact resistance of PVC is shown to be improved by blending therewith polymers derived from monomer systems comprised of at least about 80 percent by weight ethylene oxide. Polymers of at least about 80 percent ethylene oxide and about 0.1 to 2 percent of a symmetrical diepoxide as crosslinking agent are also disclosed.

8 Claims, No Drawings

ETHYLENE OXIDE POLYMERS AS IMPACT MODIFIERS FOR PVC

BACKGROUND OF THE INVENTION

1. Field of the Invention

This invention relates to impact modification of PVC.

2. Description of the Prior Art

Although the PVC impact modifier art is a crowded one since there is a commercial need for such impact modification, it has never been suggested that ethylene oxide polymers would function as PVC impact modifiers.

Polyethylene oxide (PEO) having pendant epoxy groups, having been prepared from a monomer system comprised of an assymetrical diepoxide, i.e., one having two epoxide groups of different reactivity, has been shown to be a plasticizer for PVC, but such polymers were not shown to act as PVC impact modifiers. U.S. Pat. No. 3,297,783 to Bailey, Jr.

Branched chain alkylene oxide polymers, especially butene-1-oxide polymer, in combination with rubbery post chlorinated polyethylene has been shown to be a combined melt flow and impact modifier system for post chlorinated polyvinyl chloride (PCPVC). U.S. Pat. No. 3,453,347. However, the art of impact modification of PCPVC is quite different to that of PVC impact modification, and furthermore butene-1-oxide polymer does not in fact significantly function as an impact modifier in PVC itself.

SUMMARY OF THE INVENTION

It was therefore quite surprising to discover that addition to polyvinyl chloride of a polymer derived from a monomer system comprised of at least about 80 percent by weight ethylene oxide and free of epoxy groups along the polymer chain greatly increases the impact strength, especially at low temperatures. An additional, and quite unexpected, advantage of such ethylene oxide polymers is that they also dramatically reduce the melt viscosity of PVC at high temperatures without any decrease in heat distortion temperature (DTUFL) of the solid PVC, thus improving its melt flow characteristics. The invention also includes polymers derived from a monomer system comprised of at least about 80 percent by weight ethylene oxide and about 0.1 to 2 percent by weight of a symmetrical diepoxide as a crosslinking agent for said polymer.

DETAILED DESCRIPTION OF THE INVENTION

The ethylene oxide polymers contemplated as impact modifiers for PVC in this invention are polymerized from monomer systems comprised of at least about 80 percent by weight ethylene oxide, and are free of pendant epoxy groups. The ethylene oxide polymers preferably have a viscosity average molecular weight of at least about 200,000 and up to about 10,000,000. The ethylene oxide polymers can be crosslinked by incorporating a small amount, about 0.01 to 5 percent by weight, preferably about 0.1 to about 3 percent by weight, based on total monomers, of a symetrical terminal diepoxide. These crosslinked versions are themselves novel. Asymetrical diepoxides, i.e., those having two epoxy groups of differing reactivity, cannot be used because they cause pendant epoxy groups in the ethylene oxide polymers, and destroy the impact modifier utility. Suitable diepoxides for use in this invention are 1,4-butanediol diglycidylether, resorcinol diglycidyl ether, and Bisphenol A diglycidylether.

Up to about 20 percent by weight propylene oxide or other monoepoxides can be included in the monomer system used to make the ethylene oxide polymer, although the use thereof is quite optional.

Any PVC is suitable in the invention, since the ethylene oxide polymer appears to impact modify all PVC. Of course, any of the usual PVC fillers, colorants, and other additives can be used.

The amount of ethylene oxide polymer which is used is any amount sufficient to improve the impact resistance of the PVC. Amounts of at least 1 part ethylene oxide polymer per hundred parts PVC are necessary to significantly improve the impact resistance values, and amounts as much as 30 parts are operable. Preferably, about 4 to 20 parts can be used.

As another advantage of this invention, it was found that the melt flow properties were improved by this invention, making the impact modified PVC more suitable for injection molding applications.

The impact modified PVC polymers have outstanding utility in a wide variety of applications where a rigid, impact resistant PVC is needed.

The following examples are presented to illustrate a few embodiments of the invention. All parts and percentages are by weight.

EXAMPLE 1

One hundred parts of PVC having a K=69 are blended with 8 parts of ethylene oxide homopolymer having a viscosity average molecular weight of about 400,000 and the following additives: 0.6 parts of a high molecular weight methyl methacrylate, butyl methacrylate, ethyl acrylate terpolymer processing aid, 0.9 parts calcium stearate, 0.6 parts low molecular weight hydrocarbon wax having a 165° C. melting point, 10 parts titanium dioxide pigment, and 2.5 parts dibutyl tin (bis alkyl thioglycolate) Advastab TM-180, Cincinnati Milicron) stabilizer by mixing on a two roll rubber mill at 360° F. for seven minutes.

The notched Izod impact resistance of the resultant composition at 23° C. was increased from 1 ft.-lb./in. (for the unmodified PVC) to 21 ft.-lb./in. for the PEO modified PVC.

EXAMPLE 2

Example 1 was repeated, except using a ethylene oxide homopolymer of a viscosity average molecular weight of 1,000,000. The notched Izod impact resistance was 21 ft.-lb./in.

EXAMPLE 3

Example 1 was repeated except using 8 parts crosslinked ethylene oxide polymer which was prepared by copolymerizing ethylene oxide with butane glycol diglycidyl ether crosslinker at a level of 2%. The milling time was four minutes instead of seven. The notched Izod impact strength of the blend was 22 ft. lb./in.

EXAMPLE 4

Example 1 was repeated except using an ethylene oxide/propylene oxide compolymer at a 90/10 weight ratio and the notched Izod impact strength was 18 ft. lb./in.

EXAMPLE 5

Example 1 was repeated, except using 0.25, 1.5, 2.5, 4, 6, and 8 parts of butylene oxide homopolymer instead of the ethylene oxide homopolymer. The impact strength was not improved in any of these experiments.

EXAMPLE 6

In a typical simple injection molding formulation containing 100 parts of a PVC having a K=69 and 3 parts of TM-180, various poly(ethylene oxides) were added, and tested as to melt flow improvement as compared with unmodified PVC and PVC containing a conventional MBS (methyacrylate-butadiene-styrene) modifier. In each case, the modifier concentration was 4 parts. The results are reported in the following table.

TABLE

| Modifier | % Improvement in Flow |
| --- | --- |
| None | — |
| MBS | 0 |
| Ethylene oxide polymer of Example 1 | 50 |
| Ethylene oxide polymer of Example 2 | 36 |
| Crosslinked ethylene oxide polymer of Example 3 | 27 |

I claim:

1. Composition comprising an impact-resistant blend of polyvinyl chloride and a polymer derived from a monomer system comprised of at least about 80 percent by weight ethylene oxide having a viscosity average molecular weight of about 200,000 to 10,000,000 and free of pendant epoxy groups along the polymer chain, said polymer comprising about 1 to 30 parts by weight based on 100 parts of polyvinyl chloride in the blend.

2. Composition of claim 1 wherein said monomer system consists essentially of ethylene oxide.

3. Composition of claim 1 wherein said polymer has a viscosity average molecular weight of about 200,000 to about 10,000,000.

4. Composition of claim 1 wherein said monomer system further includes about 0.01 to about 3.5 percent by weight of a symmetrical diepoxide as a crosslinking agent for said polymer.

5. Composition of claim 1 wherein said polymer comprises about 4 to 20 parts by weight based on 100 parts of polyvinyl chloride in the blend.

6. Composition of claim 1 wherein said monomer system includes up to 20 percent by weight of one or more alkylene oxides rather than ethylene oxide.

7. Composition of claim 1 wherein said monomer system includes up to about 20 percent by weight propylene oxide.

8. Process for impact modification and for improving the melt flow properties of polyvinyl chloride comprising adding thereto about 1 to 30 parts by weight of a polymer based on 100 parts of polyvinyl chloride, said polymer derived from a monomer system comprised of at least about 80 percent by weight ethylene oxide, having a viscosity average molecular weight of about 200,000 to 10,000,000 and free of pendant epoxy groups along the polymer chain.

* * * * *